(12) United States Patent
Tsuge et al.

(10) Patent No.: US 11,512,374 B2
(45) Date of Patent: Nov. 29, 2022

(54) DUPLEX STAINLESS STEEL AND MANUFACTURING METHOD THEREOF

(71) Applicant: NIPPON STEEL Stainless Steel Corporation, Tokyo (JP)

(72) Inventors: Shinji Tsuge, Tokyo (JP); Yuusuke Oikawa, Tokyo (JP)

(73) Assignee: NIPPON STEEL STAINLESS STEEL CORPORATION, Tokyo (JP)

(*) Notice: Subject to any disclaimer, the term of this patent is extended or adjusted under 35 U.S.C. 154(b) by 278 days.

(21) Appl. No.: 16/498,725

(22) PCT Filed: Mar. 30, 2018

(86) PCT No.: PCT/JP2018/013892
§ 371 (c)(1),
(2) Date: Sep. 27, 2019

(87) PCT Pub. No.: WO2018/181990
PCT Pub. Date: Oct. 4, 2018

(65) Prior Publication Data
US 2021/0108297 A1  Apr. 15, 2021

(30) Foreign Application Priority Data
Mar. 30, 2017 (JP) .............................. JP2017-066873

(51) Int. Cl.
| | | |
|---|---|---|
| *C22C 38/44* | (2006.01) |
| *C21D 6/00* | (2006.01) |
| *C21D 6/04* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/48* | (2006.01) |
| *C22C 38/50* | (2006.01) |
| *C22C 38/54* | (2006.01) |
| *C22C 38/16* | (2006.01) |
| *C22C 38/12* | (2006.01) |
| *C22C 38/52* | (2006.01) |
| *C22C 38/46* | (2006.01) |

(52) U.S. Cl.
CPC .............. *C22C 38/44* (2013.01); *C21D 6/002* (2013.01); *C21D 6/004* (2013.01); *C21D 6/008* (2013.01); *C21D 6/04* (2013.01); *C21D 8/0205* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/12* (2013.01); *C22C 38/16* (2013.01); *C22C 38/42* (2013.01); *C22C 38/46* (2013.01); *C22C 38/48* (2013.01); *C22C 38/50* (2013.01); *C22C 38/52* (2013.01); *C22C 38/54* (2013.01); *C21D 8/0226* (2013.01)

(58) Field of Classification Search
CPC ....................................................... C22C 38/44
See application file for complete search history.

(56) References Cited

U.S. PATENT DOCUMENTS

| | | | |
|---|---|---|---|
| 9,365,914 B2 * | 6/2016 | Oikawa ................ | C21D 8/0263 |
| 2011/0097234 A1 | 4/2011 | Oikawa et al. | |
| 2013/0343948 A1 | 12/2013 | Oikawa et al. | |

FOREIGN PATENT DOCUMENTS

| | | |
|---|---|---|
| EP | 2684973 A1 | 1/2014 |
| JP | H05125558 A * | 5/1993 |
| JP | 2003-41346 A | 2/2003 |
| JP | 2009-7638 A | 1/2009 |
| JP | 2012-197509 A | 10/2012 |
| JP | 2016-53213 A | 4/2016 |
| WO | WO 2009/119895 A1 | 10/2009 |

OTHER PUBLICATIONS

Kajimura, "Development of Resource Saving Metals and Alloys (I)—Development of Resource Saving Stainless Steels," Nishiyama Memorial Seminars, The Iron and Steel Institute of Japan, 215 and 216, Dec. 13 and 20, 2013, pp. 19-45, with a partial English translation.

* cited by examiner

*Primary Examiner* — Jophy S. Koshy
(74) *Attorney, Agent, or Firm* — Birch, Stewart, Kolasch & Birch, LLP

(57) ABSTRACT

A duplex stainless steel and method of manufacturing the same, said steel having an amount of Cr in an extraction residue [Cr] of 0.005 to 0.050% and an amount of Nb in an extraction residue [Nb] of 0.001 to 0.080%, the [Nb]/[Cr] ratio being 0.2 or more. By slow cooling down to 800° C., then fast cooling down to 600° C., it is possible to control the precipitation of chromium nitrides and niobium nitrides, and by making the ratio [Nb]/[Cr] 0.2 or more, it is possible to raise the corrosion resistance. Further, by reducing Mn to less than 2.0% and N to 0.25% or less, then adding a trace amount of Nb, the effect of raising the critical pitting temperature CPT is obtained.

6 Claims, 1 Drawing Sheet

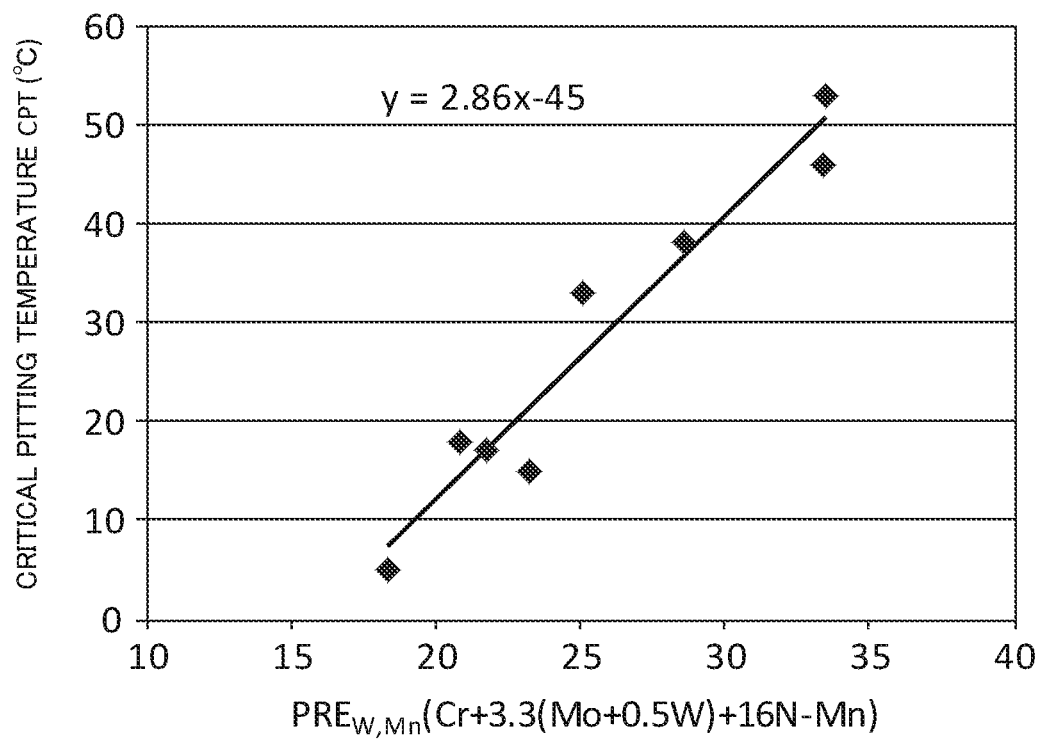

DUPLEX STAINLESS STEEL AND MANUFACTURING METHOD THEREOF

FIELD

The present invention relates to a duplexs stainless steel (two-phase stainless steel) material exhibiting excellent corrosion resistance in an environment having a high chloride ion concentration close to brackish water or seawater and a manufacturing method thereof.

BACKGROUND

Duplex stainless steel contains large amounts of Cr, Mo, Ni, and N. Intermetallic compounds and nitrides easily precipitate. Therefore, the steel is heated for solution heat treatment at 1000° C. or more to make the precipitates enter solid solution. Recently, alloy element-conserving type duplex stainless steel conserving Ni, Mo, etc., containing Mn, and greatly lowering the susceptibility of intermetallic compounds to precipitation has been developed.

In alloy element-conserving type duplex stainless steel, the most influential precipitates are chromium nitrides. Chromium nitrides are precipitates of Cr (chrome) and N (nitrogen) bonded together. In duplex stainless steel, cubic crystal CrN or hexagonal crystal $Cr_2N$ often precipitate in the ferrite grains or at the ferrite boundaries. If these chromium nitrides precipitate, the impact characteristics are lowered. Also, along with precipitation, chrome-poor layers are formed, whereby the corrosion resistance falls.

The inventors clarified the relationship between precipitation of chromium nitrides and the chemical composition, controlled the chemical composition to suppress the precipitation of chromium nitrides, and invented alloy element-conserving type duplex stainless steel excellent in corrosion resistance and impact characteristics (PTL 1). In particular, in this alloy element-conserving type duplex stainless steel, the Mn content is increased to suppress the precipitation of nitrides. Further, the inventors disclosed in PTL 1 the fact that by selectively including a trace amount of V or Nb with affinity with N, it is possible to suppress the speed of precipitation of chromium nitrides at a weld zone and improve the corrosion resistance of the weld heat affected zone. Such alloy element-conserving type duplex stainless steel can be made thinner by making use of its high strength. Not only can cost reduction be expected, but also the corrosion resistance and other properties are excellent, so this steel is already being used in various fields.

As alloy element-conserving type duplex stainless steel, standards for two types of steel, SUS 821L1 and 323L, have been established by the Japan Industrial Standard (JIS). These are being used as alternatives to general purpose stainless steel such as the austenitic stainless steels SUS 304 and 316L. These types of steel are suitable for environments with relatively low chloride ion concentrations, but there are limits to application to severely corrosive environments. As types of duplex stainless steel exhibiting corrosion resistance of SUS 316L or more, SUS 329J1, 329J3L, and 329J4L etc. have been standardized in the past. However, these types of stainless steel are relatively expensive. To expand applications as general purpose steel, further improvement of the economicalness is required.

The inventors disclosed, as duplex stainless steel exhibiting a corrosion resistance of SUS 316L or more, steel raised in amount of Mn to 2.0% or more and amount of N to 0.20% or more, having a PI=Cr+3.3Mo+16N of 30 to 38, and raised in austenite precipitation temperature ypre (PTL 2). In this way, the method of including Mn to raise the solid solubility of N is also a method lowering the cost and raising the economicalness.

Further, to raise the intergranular corrosion resistance of duplex stainless steel with a system of constituents including a high Mo content of 2 to 5%, duplex stainless steel obtained by fast cooling by 3° C./s or more in the cooling process after heat treatment conditions to thereby control the chemical composition of the duplex structures and decrease the Cr-poor parts at the austenite phase sides of the ferrite/austenite boundaries has also been proposed (PTL 3).

CITATIONS LIST

[Patent Literature]
[PTL 1] WO2009/119895
[PTL 2] Japanese Unexamined Patent Publication No. 2012-197509
[PTL 3] Japanese Unexamined Patent Publication No. 2016-53213
[Nonpatent Literature]
[NPL 1] Haruhiko KAJIMURA: 215.216th Nishiyama Memorial Seminars, ed. by the Iron and Steel Institute of Japan, (2013), 17.

SUMMARY

Technical Problem

The alloy element-conserving type duplex stainless steels proposed in PTLs 1 to 2 exhibit commensurate corrosion resistances, but in actuality cannot be said to have the recently sought sufficient corrosion resistance in environments with a high chloride ion concentration such as brackish water and seawater. Further, the duplex stainless steel shown in PTL 3 has corrosion resistance, but has difficulties in terms of economy since it contains Mo in a large amount.

Therefore, the present invention has as its object to provide alloy element-conserving type duplex stainless steel which has a corrosion resistance level of SUS 329J1 or more and has excellent corrosion resistance even in an environment with a high chloride ion concentration close to brackish water or seawater.

Solution to Problem

Raising the N (nitrogen) content like in PTL 2 is one solution for securing corrosion resistance. However, N is an element impairing the hot workability of steel. The N content, therefore, is preferably lower.

Further, Mn is an element lowering the corrosion resistance of stainless steel. Keeping down the Mn content is one method for designing steel economical in terms of performance/cost. The inventors, from this perspective, made the upper limit of Mn 2.0%, made the upper limit of N 0.25%, and thereby designed the alloy elements of the steel to give excellent performance/cost.

As the means for evaluating the pitting resistance for the purpose of simulating an environment with a high chloride ion concentration close to brackish water or seawater from a temperate zone to a tropical zone, the critical pitting temperature (CPT) defined in JIS G0590: 2013 was used. This test method envisions the potential of the steel material becoming higher in the natural environment due to the effects of microorganisms etc., imparts a potential of 0.745VvsSSE (SSE is the potential referring to the silver-silver chloride electrodes) to the steel material, raises the temperature of the sample in the 1M-NaCl test solution, and finds the temperature at which pitting occurs.

Using this test method, the CPTs of duplex stainless steel matrix test pieces and test pieces subjected to thermal cycles simulating welding are measured.

In general, the pitting resistance of stainless steel is ranked by pitting resistance equivalent. This pitting resistance equivalent (PRE) is often represented by the formula Cr+3.3Mo+16N. Furthermore, considering the detrimental effect of Mn and the advantageous effect of W, the formula of $PRE_{W,Mn}$=Cr+3.3(Mo+0.5 W)+16N−Mn has been proposed (NPTL 1). The inventors used this formula to research the correlation between the pitting resistance equivalent and CPT of the matrix test piece. As a result, it was learned that the correlation substantially conforms to the relationship of:

$$\text{CPT calculated value} = 2.86(Cr+3.3(Mo+0.5 W)+16N-Mn)-45(°C.) \quad \text{(formula 1)}$$

and the error, if any, is 5 to 10° C. or so (FIG. 1. Points in FIG. 1 show measured values for different types of stainless steel).

Next, it was reconfirmed that the CPT of test pieces subjected to a thermal cycle simulating welding is improved by lowering the amount of N and adding suitable quantities of V, Nb, and other optional elements.

The inventors discovered that if decreasing N to 0.25% or less, then adding a trace amount of Nb, the effect of raising the CPT of test pieces subjected to a thermal cycle can be easily obtained. Therefore, the inventors proceeded with research on the method of heating for solution heat treatment of steel with Mn made 2.0% or less, N made 0.25% or less, and a trace amount of Nb added, the effects on the precipitation of chromium nitrides and niobium nitrides, and the method of raising the pitting resistance of the matrix material.

It is known that the corrosion resistance of stainless steel, in particular the pitting resistance, is affected by the types, compositions, sizes, etc. of the inclusions and precipitates in the steel. Among these, inclusions are formed along with deoxidation and desulfurization of steel. The inventors, based on the findings relating to pitting resistance of duplex stainless steel up to then, thought that by including Al in 0.003 to 0.05%, then including Ca in 0.0005 to 0.005% and Mg in 0.0001 to 0.003%, an excellent pitting resistance could be obtained and applied this idea to the R&D of the steel of the present invention.

They clarified that in steel made to include Nb: 0.005 to 0.10%, including an amount of Cr in the extraction residue of the matrix material: [Cr] of 0.005 to 0.050% and an amount of Nb in the extraction residue: [Nb] of 0.001 to 0.080%, and having an [Nb]/[Cr] ratio of 0.2 or more, the CPT of the matrix material becomes a high value. Based on other research results as well, they arrived at the present invention.

That is, the gist of the present invention is as follows:
(1) Duplex stainless steel comprising, by mass %,
C: 0.001 to 0.03%,
Si: 0.05 to 1.5%,
Mn: 0.1 to less than 2.0%,
Cr: 20.0 to 26.0%,
Ni: 2.0 to 7.0%,
Mo: 0.5 to 3.0%,
N: 0.10 to 0.25%,
Nb: 0.005 to 0.10%, and
Al: 0.003 to 0.05%, further comprising one or more of
W: 0.01 to 1%,
Co: 0.01 to 1.0%,
Cu: 0.01 to 2.0%,
V: 0.01 to 0.3%,
Ti: 0.001 to 0.03%, and
B: 0.0001 to 0.0050%,
having a balance of Fe and unavoidable impurities, and in impurities, restricting
O: 0.006% or less,
P: 0.05% or less, and
S: 0.003% or less,
the steel having
an amount of Cr in an extraction residue [Cr] of 0.005 to 0.050% and
an amount of Nb in an extraction residue [Nb] of 0.001 to 0.080%,
an [Nb]/[Cr] ratio being 0.2 or more.

(2) Duplex stainless steel comprising, by mass %,
C: 0.001 to 0.03%,
Si: 0.05 to 1.5%,
Mn: 0.1 to less than 2.0%,
Cr: 20.0 to 26.0%,
Ni: 2.0 to 7.0%,
Mo: 0.5 to 3.0%,
N: 0.10 to 0.25%,
Nb: 0.005 to 0.10%,
Al: 0.003 to 0.05%,
Ca: 0.0005 to 0.005%, and
Mg: 0.0001 to 0.003%,
further comprising one or more of,
W: 0.01% to 1%,
Co: 0.01 to 1.0%,
Cu: 0.01 to 2.0%,
V: 0.01 to 0.3%,
Ti: 0.001 to 0.03%,
B: 0.0001 to 0.0050%, and
REM: 0.005 to 0.10%,
having a balance of Fe and unavoidable impurities,
in impurities, restricting
O: 0.006% or less,
P: 0.05% or less, and
S: 0.003% or less,
the steel having
an amount of Cr in an extraction residue [Cr] of 0.005 to 0.050% and
an amount of Nb in an extraction residue [Nb] of 0.001 to 0.080%, an [Nb]/[Cr] ratio being 0.2 or more.

(3) The duplex stainless steel according to (1) or (2), wherein the critical pitting temperature (° C.) is a value of the CPT calculated value obtained by equation 1 or more:

$$\text{CPT calculated value} = 2.86(Cr+3.3(Mo+0.5 W)+16N-Mn)-45(°C.) \quad \text{(equation 1)}$$

(4) A manufacturing method of duplex stainless steel comprising
heating to a temperature of a temperature region of 940 to 1150° C.
steel comprising, by mass %,
C: 0.001 to 0.03% or less,
Si: 0.05 to 1.5%,
Mn: 0.1 to less than 2.0%,
Cr: 20.0 to 26.0%,
Ni: 2.0 to 7.0%,
Mo: 0.5 to 3.0%,
N: 0.10 to 0.25%,
Nb: 0.005 to 0.10%, and
Al: 0.003 to 0.05%, further comprising one or more of
W: 0.01% to 1%,
Co: 0.01 to 1.0%,
Cu: 0.01 to 2.0%,
V: 0.01 to 0.3%,
Ti: 0.001 to 0.03%,
B: 0.0001 to 0.0050%,
Ca: 0.0005 to 0.005%,
Mg: 0.0001 to 0.003%, and
REM: 0.005 to 0.10%,
having a balance of Fe and unavoidable impurities,
in impurities, restricting
O: 0.006% or less,
P: 0.05% or less, and
S: 0.003% or less,
then cooling the steel by an average cooling rate of less than 5° C./s until a temperature of the steel becomes a temperature of 1080° C. to 800° C., then cooling the steel so that an average cooling rate from 800° C. to 600° C. in temperature of the steel becomes 3° C./s or more.

Advantageous Effects of Invention

The duplex stainless steel obtained by the present invention has a corrosion resistance of SUS329J1 or more and exhibits excellent corrosion resistance in an environment having a high chloride ion concentration close to brackish water or seawater. Further, it is possible to obtain a duplex stainless steel material with a high economy by restricting the Mo and other expensive elements. As a result, the duplex stainless steel according to the present invention can be utilized as an economic steel material enabling a thinner thickness than a conventional steel material and having a high performance/cost ratio for riparian dams, sluice gates, tidal weirs, and other infrastructure structures or seawater desalination equipment, tanks of cargo ships, various containers, etc.

BRIEF DESCRIPTION OF DRAWINGS

FIG. 1 is a view showing a relationship between a value of $PRE_{W,Mn}$ of various types of stainless steel and critical pitting temperature (CPT).

DESCRIPTION OF EMBODIMENTS

Below, the present invention will be explained. Note that, in this Description, unless particularly indicated otherwise, the % of the constituents indicate mass %.

C is restricted to a content of 0.03% or less so as to secure the corrosion resistance of the stainless steel. If included in over 0.03%, at the time of hot rolling, Cr carbides are formed and the corrosion resistance and toughness deteriorate. Preferably, the content may be made 0.025% or less, more preferably 0.023% or less.

On the other hand, from the viewpoint of the cost of reducing the amount of C of the stainless steel, 0.001% is made the lower limit.

Si is added for deoxidation in 0.05% or more. Preferably, the content may be made 0.1% or more, more preferably 0.2% or more.

On the other hand, if added in over 1.5%, the toughness deteriorates. For this reason, the content is made 1.5% or less. Preferably, the content may be made 1.2% or less, more preferably 1.0% or less.

Mn has the effect of increasing the austenite phases and improving the toughness. Further, it has the effect of lowering the nitride precipitation temperature TN. For toughness of the matrix material and weld zone, 0.1% or more is added. Preferably, the content may be made 0.3% or more, more preferably 0.5% or more.

On the other hand, Mn is an element lowering the corrosion resistance of stainless steel, so Mn is made less than 2.0%. Preferably, the content may be made 1.8% or less, more preferably 1.5% or less.

Cr is made to be included in 20.0% or more for securing the basic corrosion resistance of the invention steel. Preferably, the content may be made 21.0% or more, more preferably 21.5% or more.

On the other hand, if including Cr in over 26.0%, the ferrite phase fraction increases and the toughness and corrosion resistance of the weld zone are impaired. For this reason, the content of Cr was made 26.0% or less. Preferably, the content may be made 25.0% or less, more preferably 24.5% or less.

Ni stabilizes the austenite structures and improves the corrosion resistance with respect to various types of acids and further the toughness by being included in 2.0% or more. By increasing the Ni content, it becomes possible to lower the nitride precipitation temperature. Preferably, the content may be made 3.0% or more, more preferably 4.0% or more.

On the other hand, Ni is an expensive alloy element. In the steel of the present invention which covers alloy-conserving duplex stainless steel, from the viewpoint of cost, the Ni is limited to 7.0% or less in content. Preferably, the content may be made 6.5% or less, more preferably 6.0% or less.

Mo is an element extremely effective for raising the corrosion resistance of stainless steel. To impart a corrosion resistance of SUS 316 or more, 0.5% or more may be included. Preferably, the content may be made 0.8% or more, more preferably 1.0% or more.

On the other hand, Mo is expensive and is an element promoting precipitation of intermetallic compounds. In the steel of the present invention, from the viewpoint of suppressing precipitation at the time of hot rolling and the economic viewpoint, the Mo content should be as small as possible, so it is made 3.0% or less. Preferably, the content may be made less than 2.5%, more preferably 2.0% or less, still more preferably 1.5% or less.

N is an element forming solid solution austenite phases and effective for raising the strength and corrosion resistance of duplex stainless steel, so 0.10% or more is included. Preferably, the content may be made 0.12% or more, more preferably 0.15% or more.

On the other hand, the solid solution limit becomes higher corresponding to the Cr content, but in the steel of the present invention, if over 0.25% is included, the Cr nitrides precipitate and the toughness and corrosion resistance are impaired. For this reason, the N content was made 0.25% or less. Preferably, the content may be made 0.23% or less, more preferably 0.20% or less.

Nb is an element which is strong in affinity with N and has the action of further lowering the speed of precipitation of chromium nitrides. For this reason, in the steel of the present invention, 0.005% or more is included. Preferably, the content may be made 0.010% or more, more preferably 0.020% or more, still more preferably 0.030% or more.

On the other hand, if Nb is included in over 0.10%, nitrides of Nb precipitate in large amounts and impair the toughness, so the content is made 0.10% or less. Preferably, the content may be made 0.090% or less, more preferably 0.085% or less, still more preferably 0.080% or less.

Note that, Nb is an expensive element, but by proactively utilizing Nb contained in low grade scrap, it is possible to render the melting and raw material costs of stainless steel inexpensive. It is preferable to use such a method to reduce the cost of melting Nb-containing steel.

Al is an important element for deoxidation of steel. Further, it is included together with Ca and Mg so as to control the composition of the inclusions of the present steel. To decrease the oxygen in the steel, Al may be included together with Si. Al is included in 0.003% or more so as to control the composition of the inclusions and raise the pitting resistance. Preferably, the content may be made 0.005% or more.

On the other hand, Al is an element with a relatively large affinity with N. If excessively adding it, nitrides of Al form and the toughness of the stainless steel is impaired. The extent depends on the N content, but if Al exceeds 0.05%, the toughness remarkably drops, so the content may be made 0.05% or less. Preferably, the content may be made 0.04% or less, more preferably 0.035% or less.

Ca and Mg are added to control the composition of the inclusions in the present invention steel and improve the pitting resistance and hot workability of the present invention steel. In steel to which Ca and Mg are added, these are added together with 0.003% to 0.05% of Al using melting material. Alternatively, the contents are adjusted through deoxidation and desulfurization operations. By this, the content of Ca is controlled to 0.0005% or more and the content of Mg is controlled to 0.0001% or more. Preferably, Ca may be made 0.0010% or more and Mg may be made 0.0003% or more, more preferably Ca may be made 0.0015% or more and Mg may be made 0.0005% or more.

On the other hand, Ca and Mg conversely both lower the hot workability and toughness if added in excess, so Ca may be controlled to a content of 0.0050% or less and Mg to 0.0030% or less. Preferably, Ca may be made 0.0040% or less and Mg may be made 0.0025% or less, more preferably Ca may be made 0.0035% or less and Mg may be made 0.0020% or less.

O (oxygen) is an unavoidable impurity and an element impairing the hot workability, toughness, and corrosion resistance of stainless steel, so is preferably as small in content as possible. For this reason, the O content is preferably made 0.006% or less. Further, for extreme decrease of the oxygen, extremely large cost becomes required for refining, so if considering economy, the amount of oxygen may be 0.001% or more.

Furthermore, one or more of the following elements can be included.

W is an element for improving the corrosion resistance of stainless steel in the same way as Mo. It is optionally included. In the steel of the present invention, it may be included for the purpose of raising the corrosion resistance. However, it is an expensive element, so the content may be made 1.0% or less. Preferably, the content may be made 0.7% or less, more preferably 0.5% or less. If added, preferably this may be included in 0.05 or more. If including W, to obtain its effect, 0.01% or more may be added. Preferably, the content may be made 0.05% or more, more preferably 0.10% or more.

Co is an element effective for raising the toughness and corrosion resistance of steel. It is optionally included. Even if included in over 1.0%, an effect commensurate with the cost appears not to be exhibited since Co is an expensive element, so the Co may be included in 1.0% or less. Preferably, the content may be made 0.7% or less, more preferably 0.5% or less. If including Co, to obtain this effect, 0.01% or more may be added. Preferably, the content may be made 0.03% or more, more preferably 0.10% or more.

Cu is an element raising the corrosion resistance of stainless steel against acid in an additional manner and has the action of improving the toughness, so may be included. If including Cu in over 2.0%, εCu precipitates over the solubility at the time of cooling after hot rolling and embrittles the steel, so 2.0% or less may be included. Preferably, the content may be made 1.7% or less, more preferably 1.5% or less. If Cu is included, the content may be made 0.01% or more, preferably 0.33% or more, more preferably 0.45% or more.

V is an element which has affinity with N and has the action of lowering the speed of precipitation of chromium nitrides. For this reason, it may be included. However, if over 0.3% is included, nitrides of V precipitate in large amounts and the toughness is impaired, so the content of V may be made 0.3% or less, preferably 0.25% or less, more preferably 0.20% or less. If V is included, to obtain that effect, 0.01% or more may be added. Preferably, the content may be made 0.03% or more, more preferably 0.08% or more.

Ti has extremely strong affinity with N and forms nitrides of Ti in the steel, so may be included. For this reason, if including Ti, it is necessary to make the amount extremely small. If included in over 0.03%, the nitrides of Ti start to impair the toughness, so the content may be made 0.03% or less. Preferably, the content may be made 0.02% or less, more preferably 0.015% or less. If including Ti, to obtain its effect, 0.001% or more may be added. Preferably, the content may be made 0.003% or more, more preferably 0.005% or more.

B is an element improving the hot workability of steel and may be included in accordance with need. Further, it is an element with an extremely strong affinity with N. If included in a large amount, the nitrides of B precipitate and start to impair the toughness. For this reason, the content may be made 0.0050% or less, preferably 0.0040% or less, more preferably 0.0030% or less. If including B, to obtain this effect, 0.0001% or more may be added. Preferably, the content may be made 0.0005% or more, more preferably 0.0014% or more.

The balance comprises Fe and unavoidable impurities. The "unavoidable impurities" mean elements which cannot be avoided and end up being included when producing the duplex stainless steel according to the present invention. The impurities, in particular P and S, are restricted for the following reasons:

P is an element unavoidably mixed in from the raw materials. It causes the hot workability and toughness to deteriorate, so is preferably as small in content as possible. It is limited to 0.05% or less. Preferably, the content may be made 0.03% or less. For decreasing the P to an extremely low amount, the cost of refining rises. For this reason, from the balance with the cost, the lower limit of the amount of P may be made 0.001%.

S is an element unavoidably entering from the raw materials. It causes deterioration of the hot workability, toughness, and corrosion resistance, so the content is preferably as small as possible. The upper limit is made 0.003% or less. For decreasing the S to an extremely low amount, the cost of refining rises. For this reason, from the balance with the cost, the lower limit of the amount of S may be made 0.0001%.

REMs are elements improving the hot workability of steel. For this purpose, 0.005% or more is sometimes added.

Preferably, the content may be made 0.010% or more, more preferably 0.020% or more. On the other hand, excessive addition conversely lowers the hot workability and toughness, so 0.100% or less may be included. Preferably, the content may be made 0.080% or less, more preferably 0.070% or less.

Here, "REM" is the total of the contents of La, Ce, and other lanthanoid system rare earth elements.

Next, matters relating to the extraction residue will be explained.

The duplex stainless steel according to the present invention is steel in which carbonitrides containing Nb and Cr precipitate due to the inclusion of a trace amount of Nb. The corrosion resistance, toughness, and other properties of a product in a state with the steel heated for solution heat treatment in various ways are affected by the ratios of the Nb and Cr contained in the extraction residue of the carbonitrides in the steel (below, respectively referred to as [Nb] and [Cr]) and the ratio of the same ([Nb]/[Cr]).

If the amount of Cr in the extraction residue ([Cr]) is large, the corrosion resistance and toughness are impaired. In the past, these properties were thought to be improved the smaller the [Cr]. However, in the steel of the present invention containing a trace amount of Nb, it was learned that having a certain amount of [Cr] leads to improvement of the corrosion resistance of the finished product. According to research of the inventors, it was learned that [Cr] may be made 0.005% or more. On the other hand, if [Cr] exceeds 0.050%, the toughness and corrosion resistance are impaired, so the value may be made 0.050% or less.

If the amount of Nb in the extraction residue ([Nb]) is large, the toughness of the steel is impaired. In the past, it was thought that if Nb precipitates, the effect of inclusion of Nb becomes harder to obtain, but according to research of the inventors, the finding was obtained that including [Nb] in a certain amount is effective for improvement of the corrosion resistance of the finished product. The [Nb] for this may be made 0.001% or more. Preferably, it may be made 0.003% or more.

On the other hand, if including an extremely large amount of [Nb], the toughness of the steel starts to be impaired, so [Nb] may be made 0.080% or less. Preferably, it may be made 0.050% or less.

The ratio ([Nb]/[Cr]) of the amount of Nb and amount of Cr in the extraction residue is an indicator representing the composition of the nitrides precipitating in the steel. According to research of the inventors, the finding was obtained that if the ratio is small, the corrosion resistance of the product becomes lower. As the threshold value, the value of 0.2 was obtained. For this reason, [Nb]/[Cr] may be made 0.2 or more. Preferably, the value may be made 0.3 or more, more preferably 0.4 or more.

Next, the manufacturing method will be explained.

Solution heat treatment of the stainless steel is performed for the purpose of making the chrome carbonitrides enter solid solution. Therefore, the usual practice has been to soak the steel material at a high temperature and fast cool it. In this regard, however, according to research of the inventors, the finding was obtained that not causing all of the chrome carbonitrides to enter a solid solution leads to improvement of the corrosion resistance of duplex stainless steel.

That is, the finding was obtained that by heating stainless steel of predetermined constituents to a temperature of a temperature region of 940 to 1150° C., then (for example, after extraction from the heat treatment furnace) cooling by an average cooling rate of less than 5° C./s (seconds) until the temperature of the steel becomes a temperature between 1080° C. to 800° C., then cooling by an average cooling rate of 3° C./s or more until the temperature of the steel falls from 800° C. to 600° C. (fast cooling), the corrosion resistance of the duplex stainless steel product becomes excellent.

In the past, the general thinking had been to raise the temperature of the solution heat treatment and then quickly cool the stainless steel to keep down the precipitates. The steel of the present invention is duplex stainless steel containing Nb and Cr and steel in which chromium nitrides and niobium nitride are complexly precipitated. The inventors engaged in repeated experiments based on the findings of research relating to the thermodynamics of equilibrium precipitation of such complex nitrides and speed of precipitation. As a result, they found that if the solution heat treatment temperature and temperature of starting fast cooling are too high and if the content of Nb is small, the ratio of chrome in the nitrides becomes higher and the pitting resistance falls correspondingly.

The lower limit of the solution heat treatment temperature may be made 940° C. or more so as to promote recrystallization of the steel. Preferably, it may be made 950° C. or more, more preferably 970° C. or more. On the other hand, the upper limit of the solution heat treatment temperature may be made 1150° C. so as to keep down excessive formation of chromium nitrides during cooling of the steel material. Preferably, it may be made 1100° C. or less, more preferably 1050° C. or less.

To sufficiently secure solid solution, the steel material is preferably held at the solution heat treatment temperature for 1 minute or more. The upper limit of the holding time is not particularly prescribed so long as not obstructing actual operation, but from the productivity and other economic viewpoints, 30 minutes or less is preferable.

The cooling rate after heating and until starting fast cooling is preferably slow. At the fastest, it may be made less than 5° C./s. Preferably, the speed may be made less than 3° C./s, more preferably 2° C./s or less. More preferably, it may be made 1.5° C./s or less. The lower limit of the average cooling rate at this time is not particularly set.

The temperature of starting the fast cooling is preferably low, but to increase the amount of precipitation of the Nb nitrides, the temperature of starting the fast cooling may be made 1080° C. or less. On the other hand, it is necessary to start the fast cooling at the temperature region where chromium nitrides precipitate or higher, so the temperature of starting the fast cooling may be made 800° C. or more.

If the solution heat treatment temperature is 1080° C. or less, fast cooling may be started without slow cooling. This is because precipitation of chromium nitrides can be suppressed.

However, by causing precipitation of niobium nitrides, precipitation of chromium nitrides can be suppressed, so it is preferable to slow cool as much as possible.

During the cooling after solution heat treatment, if chromium nitrides proceed to precipitate in the duplex stainless steel, the Cr-poor phases increase by that amount and the pitting resistance falls. For this reason, it is preferable to increase the cooling rate (fast cool) at the temperature region where the speed of precipitation of chromium nitrides becomes greater (800 to 600° C.). In the steel of the present invention, by including Nb, the speed of precipitation of the chromium nitrides is kept down, but if the cooling rate is less than 3° C./s, the speed of production of chromium nitrides is insufficiently kept down, the Cr-poor phases increase, and the critical pitting temperature falls. For this reason, the cooling rate may be made 3° C./s or more. Preferably, the speed may be made 5° C./s or more, more preferably 10°

C./s or more. No upper limit is particularly set for the average cooling rate at the time of fast cooling, but from the restrictions in facilities, it may be made 100° C./s or less.

From the above, preferably the steel material is heated for solution heat treatment, then cooled (slow cooled) so that the average cooling rate until the temperature of the steel becomes 800° C. becomes less than 5° C./s (preferably less than 3° C./s, more preferably 2° C./s or less), then cooled (fast cooled) so that the average cooling rate from when the temperature of the steel falls from 800° C. to 600° C. becomes 3° C./s or more (preferably 5° C./s or more, more preferably 10° C./s or more). The method of cooling is not particularly limited. For slow cooling, allowing the steel material to stand and cool inside the heat treatment furnace, putting a covering on it for cooling or allowing it to stand in the atmosphere may be considered. For fast cooling, immersion in a water tank may be considered.

As a result, the stainless steel according to the present invention contains an amount of Cr in the extraction residue [Cr] of 0.005 to 0.050% and an amount of Nb in the extraction residue [Nb] of 0.001 to 0.080% and can secure a [Nb]/[Cr] ratio of 0.2 or more.

From these, it is possible to maintain the Cr nitrides in the steel at a constant amount and the Cr-poor phases are reduced, so the corrosion resistance is improved.

The thickness of the duplex stainless steel according to the present invention is not particularly limited, but since the steel of the present invention is applied to facilities and equipment and containers used in environments with a high chloride ion concentration close to brackish water or seawater, since, in place of existing austenitic stainless steel, the steel according to the present invention enables design of steel materials reduced in thickness due to its high strength and thereby gives high economy, and due to the heat treatment and cooling controllability, the effect is better obtained if the thickness is greater than 6 mm. Preferably, it is 8 mm or more, more preferably 10 mm or more.

Note that, the temperature of the steel is preferably the temperature of the center part of the steel, but it may also be the surface temperature of the steel. In actual operation, it is possible to measure the surface temperature of the stainless steel to perform the heat treatment and control the cooling.

As explained above, in general, the pitting resistance of stainless steel is ranked by the pitting resistance equivalent. The pitting resistance equivalent (PRE) is often expressed by the formula PRE=Cr+3.3Mo+16N Further, considering the effects of Mn and W, the formula $PRE_{W,Mn}$=Cr+3.3(Mo+0.5 W)+16N-Mn has been proposed (NPL 1). The inventors used this $PRE_{W,Mn}$ to research the correlation between various types of stainless steel and the CPT. As a result, they learned that the correlation generally follows the relationship of:

CPT calculated value (° C.)=2.86(Cr+3.3(Mo+0.5 W)+16N-Mn)-45(° C.)    (formula 1).

In experiments by the inventors, it became clear that the error between the actual critical pitting temperature (CPT) and the CPT calculated value, if any, is 5 to 10° C. or so (FIG. 1).

The stainless steel according to the present invention is kept down in N, given a trace amount of Nb and subjected to solution heat treatment, and is made to contain suitable quantities of carbonitrides of Nb and Cr by precipitation to thereby raise the pitting resistance. As a result, it was confirmed that the critical pitting temperature (° C.) of the stainless steel according to the present invention becomes higher than the CPT calculated value (° C.) obtained by (formula 1). That is, it was confirmed that the actual critical pitting temperature (CPT (measured value)) of the stainless steel according to the present invention is a value of the CPT (calculated value) obtained by (formula 1) or more.

Critical pitting temperature (° C.)≥2.86(Cr+3.3(Mo+0.5 W)+16N-Mn)-45(° C.)

EXAMPLES

Below, examples will be explained. Table 1 shows the chemical compositions of test steels. These steels were obtained by hot rolling laboratory melted materials or cutting out parts of actually produced materials. Fields of the constituents shown in Table 1 not describing contents show the levels were those of unavoidable impurities. "REM" means lanthanoid system rare earth elements. The content shows the total of these elements. The steel plates obtained by these steels (plate thickness×100 mm width×300 mm length) were heat treated in various ways. Thermocouples were inserted into the center parts of thickness of the steel plates and their temperatures were measured during the heat treatment. Further, the surface temperatures after extracting the steel plates from the heat treatment furnace were measured by radiation thermometers. The steel plates were mainly cooled by immersion in a water tank.

First, each steel plate was placed in a heat treatment furnace and heated. It was soaked at a heating temperature ("heating temperature" of Table 2) for 5 to 30 minutes, then the steel plate was extracted from the heat treatment furnace. At the time when the surface temperature became a predetermined temperature ("cooling start temperature" of Table 2), the steel plate was immersed in a water tank to start the cooling (fast cooling). The cooling rate after extraction from the heat treatment furnace until start of cooling (fast cooling) was described in Table 2 as the "cooling rate 1". The cooling rate at the time of fast cooling was adjusted by adding a commercially available additive to the water in the water tank so as to obtain the desired cooling rate. Further, for comparison, sometimes water cooling was omitted. The average cooling rate was found by continuously measuring the temperature of a thermocouple at the center of plate thickness. The average cooling rate from extraction from the heat treatment furnace to the start of fast cooling (for example, until immersion in a water tank) was described in Table 2 as the "cooling rate 1". Next, the average cooling rate in the section where the temperature of the steel plate fell from 800° C. to 600° C. was described in Table 2 as the "cooling rate 2". Note that, if immediately immersing the steel in a water tank after extraction from the heat treatment furnace, no cooling rate 1 is obtained, so "-" is described. Further, No. 19 of Table 2 was allowed to stand in the heat treatment furnace and slow cool after heating in the furnace, so the cooling start temperature and the cooling rate 1 are both not described.

Table 2 shows the thicknesses of the steels, the heat treatment conditions, the amounts of Cr and Nb in the extraction residues ([Cr], [Nb]) and their ratios [Nb]/[Cr], the measured values of the CPT, the calculated values of the CPT (value of (formula 1)), and differences of the same.

The [Cr] and [Nb] in the extraction residue and the ratio [Nb]/[Cr] were found by the following procedure: The steel was heated for solution heat treatment under various conditions.

A 2×15×50 mm sample was cut out by machining from the surface layer of the steel material after cooling.

The entire surface of the sample was wet polished by #600 abrasive.

The sample was electrolyzed in a nonaqueous solution (3% maleic acid+1% tetramethylammonium chloride+balance methanol) (100 mV constant voltage) to dissolve the matrix.

A 0.2 μm pore size filter was used to filter the residue (=precipitate) and extract the precipitate.

The chemical composition of the residue was analyzed and the contents of chrome and niobium were found. The content of chromium and the content of niobium in the residue were defined as [Cr] and [Nb] and the ratio [Nb]/[Cr] was found.

The method of measuring the CPT will be explained. First, in the same way as the sample for extraction residue use, a 2×15×30 mm sample was cut out from the surface layer of the steel material by machining. The surface layer part was polished as a test surface and was tested in accordance with the method of JIS G0590. The part was started to be raised in temperature from 0° C., was held at a potential of 0.745mVvsSSE while started to be raised in temperature from 0° C., and was measured for the value of the current. The temperature at the point of time when the current density suddenly rose was found during this as the critical pitting temperature (CPT).

It was learned that each of the steels of the working examples of the present invention had a difference of the critical pitting temperature (CPT measured value) and CPT calculated value (value of (formula 1)) of a value of 0° C. or more and an excellent corrosion resistance. On the other hand, it is learned that, in the comparative examples, the value of CPT becomes smaller than the calculated value (formula 1).

In the above way, according to the present invention, it became clear that duplex stainless steel excellent in corrosion resistance is obtained.

TABLE 1

| No. | C | Si | Mn | P | S | Cr | Ni | Mo | W | Co | Cu | N |
|---|---|---|---|---|---|---|---|---|---|---|---|---|
| EX. | | | | | | | | | | | | |
| 1 | 0.015 | 0.42 | 1.35 | 0.023 | 0.0011 | 23.8 | 4.58 | 1.15 | | | 0.23 | 0.193 |
| 2 | 0.018 | 0.38 | 0.35 | 0.019 | 0.0013 | 23.2 | 4.52 | 0.52 | | 0.25 | 0.15 | 0.145 |
| 3 | 0.021 | 0.34 | 1.85 | 0.024 | 0.0024 | 21.5 | 2.53 | 0.55 | | 0.15 | | 0.172 |
| 4 | 0.019 | 0.34 | 1.63 | 0.023 | 0.0007 | 24.3 | 4.82 | 2.14 | | 0.12 | 0.35 | 0.213 |
| 5 | 0.018 | 0.37 | 0.35 | 0.025 | 0.0006 | 23.9 | 5.02 | 1.12 | 0.15 | | 0.33 | 0.168 |
| 6 | 0.008 | 1.23 | 1.53 | 0.021 | 0.0012 | 24.1 | 5.85 | 1.08 | | | 1.52 | 0.126 |
| 7 | 0.012 | 0.24 | 0.35 | 0.028 | 0.0004 | 25.2 | 5.45 | 2.82 | 0.32 | | 0.45 | 0.238 |
| 8 | 0.025 | 0.41 | 1.23 | 0.025 | 0.0006 | 24.0 | 5.23 | 1.08 | | | 0.54 | 0.138 |
| 9 | 0.018 | 0.43 | 1.28 | 0.026 | 0.0007 | 23.8 | 5.01 | 1.14 | 0.05 | 0.14 | 0.35 | 0.176 |
| 10 | 0.017 | 0.40 | 1.45 | 0.020 | 0.0010 | 24.2 | 5.12 | 2.18 | | | 0.65 | 0.185 |
| 11 | 0.014 | 0.41 | 0.80 | 0.019 | 0.0005 | 25.6 | 6.02 | 1.85 | 0.72 | | 0.73 | 0.205 |
| 12 | 0.012 | 0.36 | 1.33 | 0.026 | 0.0005 | 23.6 | 5.16 | 1.27 | | 0.11 | 0.33 | 0.165 |
| 13 | 0.013 | 0.37 | 1.36 | 0.023 | 0.0008 | 23.5 | 5.01 | 1.31 | | | | 0.166 |
| 14 | 0.015 | 0.45 | 1.75 | 0.032 | 0.0007 | 23.7 | 4.98 | 1.15 | 0.02 | 0.03 | 0.02 | 0.172 |
| 15 | 0.018 | 0.42 | 1.36 | 0.031 | 0.0004 | 24.3 | 5.86 | 2.21 | 0.01 | 0.12 | 0.45 | 0.185 |
| 16 | 0.021 | 0.45 | 1.73 | 0.028 | 0.0007 | 24.5 | 5.26 | 2.31 | | | 0.08 | 0.215 |
| Comp. ex. | | | | | | | | | | | | |
| a | 0.015 | 0.42 | 0.81 | 0.022 | 0.0012 | 23.8 | 4.56 | 1.09 | | | | 0.196 |
| b | 0.018 | 0.35 | 1.25 | 0.023 | 0.0008 | 21.5 | 3.12 | 0.85 | | | | 0.142 |
| c | 0.013 | 0.62 | 0.85 | 0.025 | 0.0007 | 21.1 | 2.13 | 0.85 | | | | 0.221 |
| d | 0.016 | 0.45 | 1.05 | 0.021 | 0.0008 | 23.4 | 3.23 | 1.03 | | | | 0.082 |
| e | 0.014 | 0.45 | 1.02 | 0.026 | 0.0006 | 24.3 | 4.05 | 1.56 | | | | 0.265 |
| f | 0.013 | 0.43 | 2.53 | 0.025 | 0.0004 | 25.1 | 5.05 | 2.18 | | | | 0.165 |
| g | 0.008 | 0.52 | 1.05 | 0.028 | 0.0012 | 17.0 | 12.05 | 2.05 | | | | 0.016 |

| No. | V | Nb | Ti | B | Al | O | Ca | Mg | REM | PREw, Mn |
|---|---|---|---|---|---|---|---|---|---|---|
| Ex. | | | | | | | | | | |
| 1 | | 0.050 | | | 0.022 | 0.003 | | | | 29.33 |
| 2 | 0.08 | 0.030 | | 0.0023 | 0.018 | 0.003 | | | | 26.89 |
| 3 | | 0.035 | | | 0.005 | 0.005 | | | | 24.22 |
| 4 | | 0.023 | 0.012 | | 0.033 | 0.002 | 0.0018 | | | 33.14 |
| 5 | 0.13 | 0.035 | | 0.0015 | 0.023 | 0.003 | 0.0024 | | | 30.18 |
| 6 | 0.02 | 0.008 | 0.005 | | 0.025 | 0.003 | | 0.0024 | 0.025 | 28.15 |
| 7 | 0.13 | 0.007 | | | 0.026 | 0.003 | 0.0019 | | | 38.49 |
| 8 | 0.07 | 0.082 | 0.015 | 0.0028 | 0.016 | 0.003 | 0.0025 | 0.0003 | | 28.54 |
| 9 | 0.08 | 0.045 | 0.008 | 0.0022 | 0.036 | 0.001 | 0.0022 | 0.0015 | 0.010 | 29.18 |
| 10 | 0.10 | 0.030 | 0.003 | 0.0014 | 0.024 | 0.002 | 0.0020 | 0.0005 | | 32.90 |
| 11 | 0.03 | 0.012 | | | 0.026 | 0.003 | | 0.0026 | 0.038 | 35.37 |
| 12 | 0.13 | 0.037 | 0.004 | 0.0022 | 0.014 | 0.003 | 0.0021 | 0.0006 | | 29.10 |
| 13 | 0.11 | 0.037 | | 0.0018 | 0.021 | 0.004 | | | | 29.12 |
| 14 | 0.03 | 0.035 | 0.002 | 0.0005 | 0.026 | 0.003 | | | | 28.53 |
| 15 | 0.12 | 0.039 | 0.001 | 0.0017 | 0.023 | 0.003 | 0.0018 | 0.0005 | | 33.21 |
| 16 | | 0.023 | | 0.0002 | 0.025 | 0.003 | | | | 33.83 |

TABLE 1-continued (mass %)

| | | Comp. ex. | | | |
|---|---|---|---|---|---|
| a | 0.001 | 0.024 | 0.003 | | 29.72 |
| b | 0.15 | 0.015 | 0.003 | | 25.33 |
| c | 0.003 | 0.035 | 0.002 | | 26.59 |
| d | 0.025 | 0.016 | 0.003 | | 27.06 |
| e | 0.012 | 0.027 | 0.003 | | 32.67 |
| f | 0.001 | 0.032 | 0.003 | | 32.40 |
| g | 0.002 | 0.018 | 0.003 | | 22.97 |

TABLE 2

| No. | Steel no. | Thickness mm | Heating temp. °C. | Cooling start temp. °C. | Cooling rate 1 °C./s | Cooling rate 2 °C./s | [Cr] mass % | [Nb] mass % | [Nb]/[Cr] | CPT (measured value) °C. | CPT (calculated value) °C. | Difference of measured value and calculated value of CPT °C. |
|---|---|---|---|---|---|---|---|---|---|---|---|---|
| | | | | | | Ex. | | | | | | |
| 1 | 1 | 10 | 1000 | 1000 | — | 60 | 0.030 | 0.040 | 1.3 | 42 | 39 | 3 |
| 2 | 1 | 10 | 1050 | 1050 | — | 60 | 0.025 | 0.025 | 1.0 | 41 | 39 | 2 |
| 3 | 1 | 10 | 1100 | 950 | 4.3 | 60 | 0.014 | 0.012 | 0.9 | 40 | 39 | 1 |
| 4 | 1 | 10 | 1150 | 950 | 4.8 | 60 | 0.010 | 0.002 | 0.2 | 40 | 39 | 1 |
| 5 | 1 | 10 | 1050 | 950 | 3.7 | 30 | 0.024 | 0.025 | 1.0 | 42 | 39 | 3 |
| 6 | 1 | 10 | 1050 | 850 | 2.8 | 30 | 0.023 | 0.025 | 1.1 | 43 | 39 | 4 |
| 7 | 2 | 20 | 1000 | 1000 | — | 15 | 0.015 | 0.017 | 1.1 | 35 | 32 | 3 |
| 8 | 3 | 50 | 1000 | 950 | 1.0 | 5 | 0.017 | 0.020 | 1.2 | 27 | 24 | 3 |
| 9 | 4 | 10 | 1050 | 950 | 3.5 | 30 | 0.007 | 0.006 | 0.9 | 52 | 50 | 2 |
| 10 | 5 | 10 | 1050 | 950 | 3.5 | 30 | 0.016 | 0.014 | 0.9 | 45 | 41 | 4 |
| 11 | 6 | 10 | 1050 | 1000 | 3.8 | 60 | 0.005 | 0.001 | 0.2 | 37 | 36 | 1 |
| 12 | 7 | 20 | 1050 | 950 | 2.2 | 30 | 0.007 | 0.002 | 0.3 | 66 | 65 | 1 |
| 13 | 8 | 10 | 1050 | 950 | 3.5 | 30 | 0.042 | 0.055 | 1.3 | 41 | 37 | 4 |
| 14 | 9 | 10 | 1050 | 900 | 3.2 | 30 | 0.019 | 0.022 | 1.2 | 43 | 38 | 5 |
| 15 | 10 | 10 | 1050 | 1000 | 3.8 | 60 | 0.007 | 0.007 | 1.0 | 55 | 49 | 6 |
| 16 | 11 | 10 | 1050 | 1000 | 3.8 | 60 | 0.006 | 0.002 | 0.3 | 58 | 56 | 2 |
| 101 | 1 | 15 | 1050 | 950 | 2.8 | 40 | 0.021 | 0.022 | 1.0 | 43 | 39 | 4 |
| 102 | 1 | 20 | 1050 | 975 | 2.4 | 20 | 0.022 | 0.021 | 1.0 | 42 | 39 | 3 |
| 103 | 1 | 30 | 1050 | 1000 | 1.8 | 10 | 0.023 | 0.018 | 0.8 | 41 | 39 | 2 |
| 201 | 12 | 20 | 1035 | 950 | 2.0 | 30 | 0.017 | 0.015 | 0.9 | 44 | 38 | 6 |
| 202 | 13 | 20 | 1035 | 950 | 2.0 | 30 | 0.016 | 0.014 | 0.9 | 41 | 38 | 3 |
| 203 | 14 | 20 | 1035 | 950 | 2.0 | 30 | 0.014 | 0.012 | 0.9 | 39 | 37 | 2 |
| 204 | 15 | 20 | 1035 | 950 | 2.0 | 30 | 0.015 | 0.015 | 1.0 | 57 | 50 | 7 |
| 205 | 16 | 20 | 1035 | 950 | 2.0 | 30 | 0.011 | 0.008 | 0.7 | 53 | 52 | 1 |
| | | | | | | Comp. ex | | | | | | |
| 17 | a | 10 | 1050 | 1050 | — | 60 | 0.007 | 0.000 | 0.0 | 36 | 38 | −2 |
| 18 | 1 | 10 | 1150 | 1100 | 5.2 | 60 | 0.015 | 0.002 | 0.1 | 36 | 39 | −3 |
| 19 | 7 | 20 | 1100 | — | — | 1 | 0.023 | 0.002 | 0.1 | 58 | 65 | −7 |
| 20 | b | 10 | 1050 | 1050 | — | 60 | 0.08 | 0.13 | 1.6 | 24 | 27 | −3 |
| 21 | c | 10 | 1100 | 1050 | 4.2 | 60 | 0.013 | 0.000 | 0.0 | 27 | 31 | −4 |
| 22 | d | 10 | 1100 | 1050 | 4.2 | 60 | 0.043 | 0.004 | 0.1 | 27 | 32 | −5 |
| 23 | e | 10 | 1100 | 1050 | 4.2 | 60 | 0.015 | 0.005 | 0.3 | 43 | 48 | −5 |
| 24 | f | 10 | 1100 | 1050 | 4.2 | 60 | 0.013 | 0.000 | 0.0 | 44 | 48 | −4 |
| 25 | g | 10 | 1050 | 1050 | — | 60 | 0.001 | 0.000 | 0.0 | 15 | 21 | −6 |

The "temperature 1" is the soaking temperature. The steel is soaked at this temperature for 5 minutes to 30 minutes.

The "temperature 2" is the surface temperature at the start of immersion under conditions of immersion in a water tank for accelerated cooling.

The "cooling rate 1" shows the average cooling rate from the temperature 1 at the time of extraction to the temperature 2 at the time of immersion in a water tank (both surface temperatures).

The "cooling rate 2" shows the average cooling rate in the section where the temperature of a thermocouple buried at the center of thickness is 800° C. to 600° C.

INDUSTRIAL APPLICABILITY

According to the present invention, it becomes possible to provide an economic duplex stainless steel material having a corrosion resistance of equal to or greater than SUS 316L in an environment with a chloride ion concentration close to brackish water or seawater. This can be used in riparian dams, sluice gates, tidal weirs, and other infrastructure structures or seawater desalination equipment, tanks of cargo ships, various containers, etc. In these and other ways, the contribution to industry is extremely great.

The invention claimed is:

1. Duplex stainless steel comprising, by mass %,
C: 0.001 to 0.03%,
Si: 0.05 to 1.5%,
Mn: 0.1 to 1.5%,
Cr: 20.0 to 26.0%,
Ni: 2.0 to 7.0%,
Mo: 0.5 to 3.0%,
N: 0.10 to 0.25%,
Nb: 0.005 to 0.10%, and
Al: 0.003 to 0.05%,
further comprising one or more of
W: 0.01 to 1%,
Co: 0.01 to 1.0%,
Cu: 0.01 to 2.0%,
V: 0.01 to 0.3%,
Ti: 0.001 to 0.03%, and
B: 0.0001 to 0.0050%,
having a balance of Fe and unavoidable impurities, and
in impurities, restricting
O: 0.006% or less,
P: 0.05% or less, and
S: 0.003% or less,
said steel having
an amount of Cr in an extraction residue [Cr] of 0.005 to 0.050 mass %,
an amount of Nb in an extraction residue [Nb] of 0.001 to 0.080 mass %, and
an [Nb]/[Cr] ratio being 0.2 or more.

2. Duplex stainless steel comprising, by mass %,
C: 0.001 to 0.03%,
Si: 0.05 to 1.5%,
Mn: 0.1 to 1.5%,
Cr: 20.0 to 26.0%,
Ni: 2.0 to 7.0%,
Mo: 0.5 to 3.0%,
N: 0.10 to 0.25%,
Nb: 0.005 to 0.10%,
Al: 0.003 to 0.05%,
Ca: 0.0005 to 0.005%, and
Mg: 0.0001 to 0.003%,
further comprising one or more of,
W: 0.01% to 1%,
Co: 0.01 to 1.0%,
Cu: 0.01 to 2.0%,
V: 0.01 to 0.3%,
Ti: 0.001 to 0.03%,
B: 0.0001 to 0.0050%, and
REM: 0.005 to 0.10%,
having a balance of Fe and unavoidable impurities,
in impurities, restricting
O: 0.006% or less,
P: 0.05% or less, and
S: 0.003% or less,
said steel having
an amount of Cr in an extraction residue [Cr] of 0.005 to 0.050 mass %,
an amount of Nb in an extraction residue [Nb] of 0.001 to 0.080 mass %, and
an [Nb]/[Cr] ratio being 0.2 or more.

3. The duplex stainless steel according to claim 1, wherein an actual critical pitting temperature (CPT measured value), in ° C., of the duplex stainless steel is greater than or equal to a CPT calculated value in ° C. obtained by equation 1:

$$\text{CPT calculated value} = 2.86(\text{Cr} + 3.3(\text{Mo} + 0.5\text{W}) + 16\text{N} - \text{Mn}) - 45 \quad \text{(equation 1)}$$

wherein Cr, Mo, W, N, and Mn in equation 1 represent the content in mass % of the corresponding elements in the duplex stainless steel.

4. The duplex stainless steel according to claim 2, wherein an actual critical pitting temperature (CPT measured value), in ° C., of the duplex stainless steel is greater than or equal to a CPT calculated value in ° C. obtained by equation 1:

$$\text{CPT calculated value} = 2.86(\text{Cr} + 3.3(\text{Mo} + 0.5\text{W}) + 16\text{N} - \text{Mn}) - 45 \quad \text{(equation 1)}$$

wherein Cr, Mo, W, N, and Mn in equation 1 represent the content in mass % of the corresponding elements in the duplex stainless steel.

5. A method of manufacturing the duplex stainless steel of claim 1, said method comprising
heating to a temperature of a temperature region of 940 to 1150° C., wherein the steel has a composition comprising, by mass %,
C: 0.001 to 0.03%,
Si: 0.05 to 1.5%,
Mn: 0.1 to 1.5%,
Cr: 20.0 to 26.0%,
Ni: 2.0 to 7.0%,
Mo: 0.5 to 3.0%,
N: 0.10 to 0.25%,
Nb: 0.005 to 0.10%, and
Al: 0.003 to 0.05%,
further comprising one or more of
W: 0.01% to 1%,
Co: 0.01 to 1.0%,
Cu: 0.01 to 2.0%,
V: 0.01 to 0.3%,
Ti: 0.001 to 0.03%, and
B: 0.0001 to 0.0050%,
having a balance of Fe and unavoidable impurities,
in impurities, restricting
O: 0.006% or less,
P: 0.05% or less, and
S: 0.003% or less,
then cooling the steel by an average cooling rate of less than 5° C./s until a temperature of said steel becomes a temperature of 1080° C. to 800° C., then cooling the steel so that an average cooling rate from 800° C. to 600° C. in temperature of the steel becomes 3° C./s or more.

6. A method of manufacturing the duplex stainless steel of claim 2, said method comprising
heating to a temperature of a temperature region of 940 to 1150° C., wherein the steel has a composition comprising, by mass %,
C: 0.001 to 0.03%,
Si: 0.05 to 1.5%,
Mn: 0.1 to 1.5%,
Cr: 20.0 to 26.0%,
Ni: 2.0 to 7.0%, Mo: 0.5 to 3.0%,
N: 0.10 to 0.25%,
Nb: 0.005 to 0.10%,
Al: 0.003 to 0.05%,
Ca: 0.0005 to 0.005%, and
Mg: 0.0001 to 0.003%,
further comprising one or more of
W: 0.01% to 1%,
Co: 0.01 to 1.0%,
Cu: 0.01 to 2.0%,
V: 0.01 to 0.3%,
Ti: 0.001 to 0.03%,
B: 0.0001 to 0.0050%, and
REM: 0.005 to 0.10%,
having a balance of Fe and unavoidable impurities,
in impurities, restricting
O: 0.006% or less,
P: 0.05% or less, and
S: 0.003% or less,
then cooling the steel by an average cooling rate of less than 5° C./s until a temperature of said steel becomes a temperature of 1080° C. to 800° C., then cooling the steel so that an average cooling rate from 800° C. to 600° C. in temperature of the steel becomes 3° C./s or more.

* * * * *